United States Patent
Ferguson et al.

(10) Patent No.: US 11,100,176 B2
(45) Date of Patent: Aug. 24, 2021

(54) DATA SHARING TOOL FOR FACILITATING REAL-TIME ACCESS TO CURRENT OR UPDATED DATASETS

(71) Applicant: Adobe Inc., San Jose, CA (US)

(72) Inventors: Courtney Ferguson, Vineyard, UT (US); Jonathan Moon, Lehi, UT (US); Bradley Rogers, Highland, UT (US)

(73) Assignee: Adobe Inc., San Jose, CA (US)

( * ) Notice: Subject to any disclaimer, the term of this patent is extended or adjusted under 35 U.S.C. 154(b) by 168 days.

(21) Appl. No.: 16/414,116

(22) Filed: May 16, 2019

(65) Prior Publication Data

US 2020/0364274 A1  Nov. 19, 2020

(51) Int. Cl.
*G06F 16/00* (2019.01)
*G06F 16/953* (2019.01)
*G06F 16/9538* (2019.01)
*G06F 16/23* (2019.01)

(52) U.S. Cl.
CPC ........ *G06F 16/953* (2019.01); *G06F 16/2379* (2019.01); *G06F 16/9538* (2019.01)

(58) Field of Classification Search
CPC . G06F 16/953; G06F 16/2379; G06F 16/9538
See application file for complete search history.

(56) References Cited

U.S. PATENT DOCUMENTS

| 2015/0142727 | A1* | 5/2015 | Louie | G06F 16/248 |
| | | | | 707/603 |
| 2015/0347734 | A1* | 12/2015 | Beigi | H04L 9/3231 |
| | | | | 713/155 |
| 2017/0060713 | A1* | 3/2017 | Wang | G06F 16/2455 |
| 2018/0351986 | A1* | 12/2018 | Johns | H04L 63/1416 |

OTHER PUBLICATIONS

Google, "Share Files from Google Drive", https://web.archive.org/web/20180818185757/https:/support.google.com/drive/answer/249, Aug. 18, 2018, accessed Jun. 14, 2019, 3 pages.

* cited by examiner

*Primary Examiner* — Hung Q Pham
(74) *Attorney, Agent, or Firm* — Kilpatrick Townsend & Stockton LLP

(57) ABSTRACT

In some embodiments, a data server generates an open data reference specifying a location for storing report data associated with a report. To generate the report data, the data server generates a data query based on a report definition that describes how the report data associated with the report is generated. The data server executes the data query on source data to obtain the report data and causes the report data to be stored on a storage device at the location specified by the open data reference. The report data can be retrieved via a network using the open data reference for integration within a third-party application. The data server further generates updated report data by executing, on the source data, an updated data query generated based on the report definition and has the report data stored on the storage device to be replaced with updated report data.

20 Claims, 9 Drawing Sheets

DATA SHARING TOOL FOR FACILITATING REAL-TIME ACCESS TO CURRENT OR UPDATED DATASETS

TECHNICAL FIELD

This disclosure relates generally to facilitating data sharing among different computing systems. More specifically, but not by way of limitation, this disclosure relates to providing a data sharing tool that allows various computing systems to openly and publicly access data being continuously updated.

BACKGROUND

The fast development of technologies such as the Internet technology, cloud computing technology, Internet of Things (IoT), and digital storage technology allows for the production and storage of a massive amount of data every day by businesses and users. This massive amount of data contains valuable information that is helpful for organizations to make informed decisions on, for example, how to improve system performance, user experiences and so on. However, the large volume of the data makes it very difficult to extract that valuable information.

Various data analysis tools and systems have been developed to extract, from large and diverse data sets, hidden patterns, unknown correlations, and other insights. These kinds of valuable information can be useful for multiple organizations and in various different applications. For example, an organization can incorporate the analytical results in its proprietary application developed to solve the unique problems of the organization. Thus it is important for a data analysis system to support sharing the analytical results with different applications in different computing systems at different network locations.

However, sharing data analytical results is a challenging task. One of the reasons is the dynamic nature of the analytical results. As new data is collected and analyzed, these analytical results are updated dynamically, and thus the shared copy obtained by another application or system would also need to be updated in order to make the shared information meaningful. Existing methods are insufficient to address this challenge. For example, some existing methods rely on complicated API calls from destination applications to data servers to re-generate queries used during the data analysis process to obtain analytical results. Such methods require software engineers to have knowledge of the API interfaces. Further, the implementation of the API calls can get very complicated when authentication is required by the data server managing the shared data. As a result, these existing data sharing methods are inefficient, inflexible and unscalable.

SUMMARY

Certain embodiments involve facilitating real-time access to current or updated datasets by using an open data reference for sharing data analytical results. In one example, a data server generates an open data reference specifying a location for storing report data associated with a report. To generate the report data, the data server generates a data query based on a report definition that describes how the report data associated with the report is generated. The data server executes the data query on source data stored in a data store to obtain the report data and causes the report data returned by the query to be stored on a storage device at the location specified by the open data reference. The report data is retrievable via a network using the open data reference for integration within a third-party application. The data server further generates updated report data by executing, on the source data, an updated data query generated based on the report definition of the report and has the report data stored on the storage device to be replaced with updated report data.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
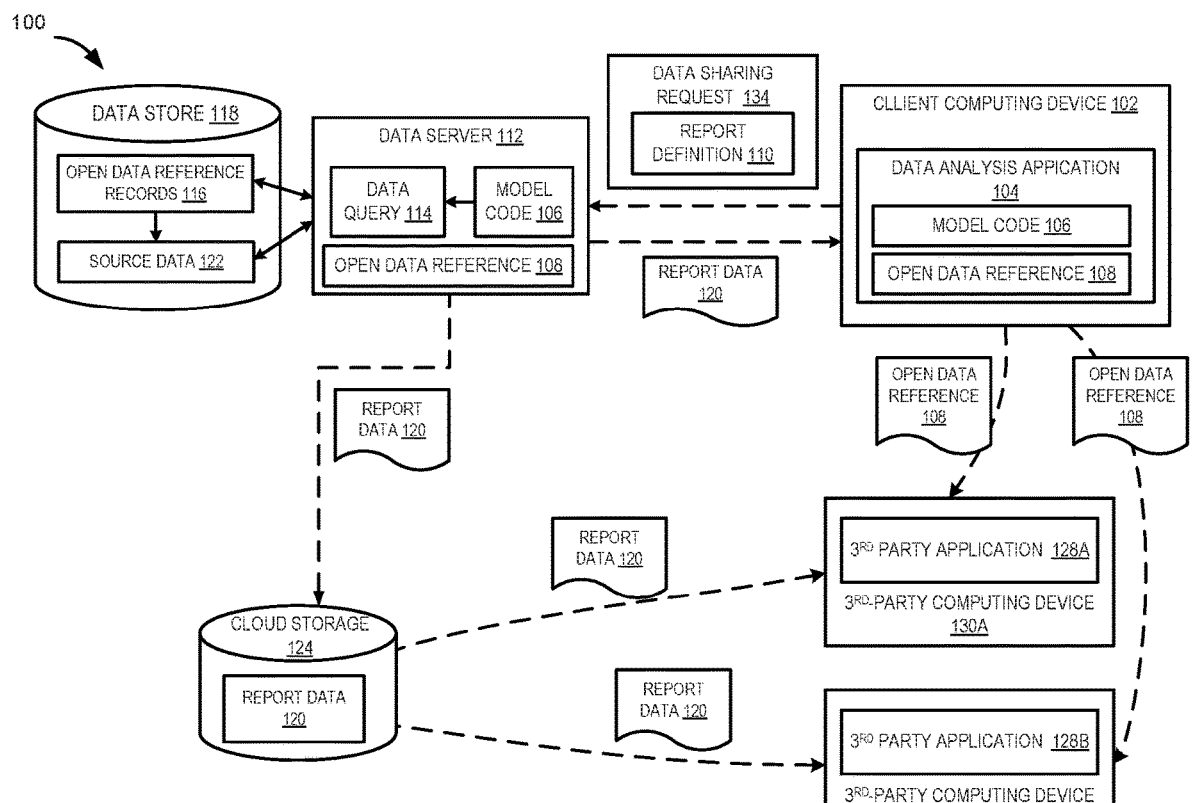
FIG. 1 depicts an example of a computing environment in which a data server and a data analysis application are coordinated to provide an open data reference for sharing data with a third party application, according to certain embodiments of the present disclosure.

Certain embodiments involve facilitating real-time access to current or updated datasets, e.g., by using an open data reference for sharing data analytical results. For instance, a data server communicates with a data analysis application that is executing on a client computing device and is configured to generate analytical results on source data. Responsive to a request to share analytical results, the data server generates an open data reference for the analytical results, such as a uniform resource locator (URL) link, specifying a location of the analytical results that are to be shared with other applications. The data server further generates a query based on a report definition of the analysis report received from the data analysis application. The report definition describes how the analytical results associated with the analysis report is generated. By executing the query on the source data, the data server obtains the analytical results and has the analytical results stored at the location specified by the open data reference. Third-party applications having possession of the open data reference can directly retrieve the analytical results of the report through the open data reference without additional operations.

The following non-limiting example is provided to introduce certain embodiments. In this example, a data analysis application executes on a client computing device and is configured for generating analysis reports to perform analysis on source data to obtain analytical results. Through the data analysis application, a user can submit a request to share the analytical results, also referred to herein as "report data." Responsive to the request, the data analysis application communicates with a data server and sends a data sharing request. Based on the data sharing request, the data server generates an open data reference that specifies the location for storing a copy of the report data to be shared and the tool for retrieving it.

For example, the open data reference can be a URL link that specifies the storage location of the report data. The data server selects the storage location and generates the open data reference based on factors such as the availability and capacity of the storage device used for storing the report data, the network location of the storage device, and so on. To maintain the information about the open data reference, the data server also creates an open data reference record. The open data reference record stores information such as an identification of the report, the open data reference, and an identification of the user who requested the open data reference.

According to further aspects of this example, the data server also receives, and stores in the open data reference record, a report definition of the analysis report. The data server further generates a query according to the report definition and executes the query on the source data to generate the report data. The data server sends the generated report data to the storage location as specified in the open data reference. The storage location can be network storage separate from the data server and configured for storing and sharing a large amount of data, such as a cloud storage. The data server periodically updates the report data by re-generating the query and executing the query on the source data to obtain the most recent report data. The most recent report data is sent to the storage location to replace the existing report data stored thereupon. In this way, the open data reference always points to the most recent report data. The data server sends the open data reference to the data analysis application where the open data reference is presented to the user for sharing with third-party applications. By following the open data reference, third-party applications can retrieve the most current report data.

If the user who requested the open data reference decides to stop sharing the report data, the data server deletes the open data reference record and causes the report data stored at the specified storage location to be removed. In this way, third-party applications can no longer access the report data even though they still have the open data reference. If later on the user decides to re-activate the open data reference, the data server generates the same data reference as before and re-creates the open data reference record. The data server generates and updates the report data as described above so that third-party applications can retrieve the shared report data using the same open data reference.

As described herein, certain embodiments provide improvements to data sharing in computing environments. These embodiments provide a tool that allows complicated and up-to-date data analytical results to be shared with third-party applications efficiently and making complex analytical results more accesible by providing familiar, user-friendly open data references, such as a URL, to retrieve analytical results while circumventing the arduous process of programming, testing, and implementing complex commands. Specifically, the data sharing tool provided herein utilizes an open data reference directly pointing to a location where a copy of the most recent data analytical results is stored. Compared with existing methods, certain embodiments provided herein eliminate the need of implementing and invoking an API for analyzing the data thereby eliminating the network communications between the third-party applications calling the API and the data server hosting the API. Additionally or alternatively, certain embodiments reduce the computational resource consumption at the data server incurred by responding to the API calls. Additionally or alternatively, certain embodiments, by storing a copy of the analytical results in a storage device separate from the data server, can easily scale up the data sharing described herein to support a large number of third-party applications. This also improves the security of the data server by eliminating direct communications between third-party applications and the data server.

As used herein, the term "source data" is used to refer to raw data or processed data generated by businesses and users through various computing environments. For example, the source data can include the data collected from a website that describes user activities, behaviors, or interactions with the website, such as the web links that a user clicked through, or the time a user spent on a certain web page. In addition, the source data can include the data describing the performance of a website or a web server hosting the website, such as the number of client computers connected to the web server, loading time of web pages of the website, response time to a user click, and so on. The source data are updated periodically to include new data that are being generated in the computing environments.

As used herein, the term "analysis report" or "report" is used to refer to data associated with a data analysis task, such as a description of the data analysis task, the analytical results and the visualization of the analytical results. The description of the data analysis task includes various information required to carry out an analysis task. For example, the report can include a report definition describing how source data is to be analyzed to generate analytical results, also referred to as "report data." A report also includes or defines the way that the report data is to be presented in a user interface. For example, a report can be a summary report used to generate and present data designed for quick overviews, such as the total number of visitors to a website. A report can also be a detailed report providing comprehensive, accurate, and detailed analysis of the relevant source data.

As used herein, the term "report definition" is used to refer to the description of how the analysis task associated with a report is to be carried out. In other words, the report definition describes how the analytical results for the report are generated. For example, the report definition can include criteria or business rules that need to be satisfied in order to generate the correct results. The report definition can further include a description of the ways or steps to generate queries for the report based on these criteria and business rules so that analytical results can be obtained by executing the queries on the source data.

As used herein, the term "report data" is used to refer to the analytical results generated by analyzing the source data according to criteria or business rules included in the report definition of the corresponding report. For example, the report data for a report can be obtained by executing queries generated based on the report definition of the report.

As used herein, the term "open data reference" is used to refer to a reference to shared data that specifies the location of the shared data and a tool for retrieving it. In one example, the open data reference includes the network address of the storage device used for storing the report data, a location of the report data within the storage space of the storage device, and a protocol used for retrieving the report data. For example, an open data reference can be a URL link such as "https://account123.blob.core.windows.net/opendata/1d4e1rq4e1f4s1d4f.csv." Through this URL link, a third-party application or a third-party computing device can directly retrieve the shared data with a file name "1d4e1rq4e1f4s1d4f.csv" from the host "account123.blob.core.windows.net" using the hypertext transfer protocol secure (HTTPS).

Referring now to the drawings, FIG. 1 is an example of a computing environment 100 in which a data server 112 and a data analysis application 104 coordinate with each other to support data sharing, according to certain embodiments of the present disclosure. In various embodiments, the computing environment 100 includes a client computing device 102 executing the data analysis application 104, the data server 112, and a data store 118 accessible by the data server 112 and configured to store source data 122 and other data such as the open data reference records 116. The computing environment 100 further includes a cloud storage 124 that is configured to store the data to be shared and is separate from the data server 112 and the data store 118.

The data analysis application 104 executed on the client computing device 102 is configured to provide functionalities for analyzing the source data 122. In one example, the data analysis application 104 is configured to allow a user of the data analysis application 104 to create a report for analyzing the source data 122. In one example, the report includes a report definition 110 describing how source data 122 is to be analyzed to generate analytical results, i.e. the report data 120 associated with the report.

Figure 5:
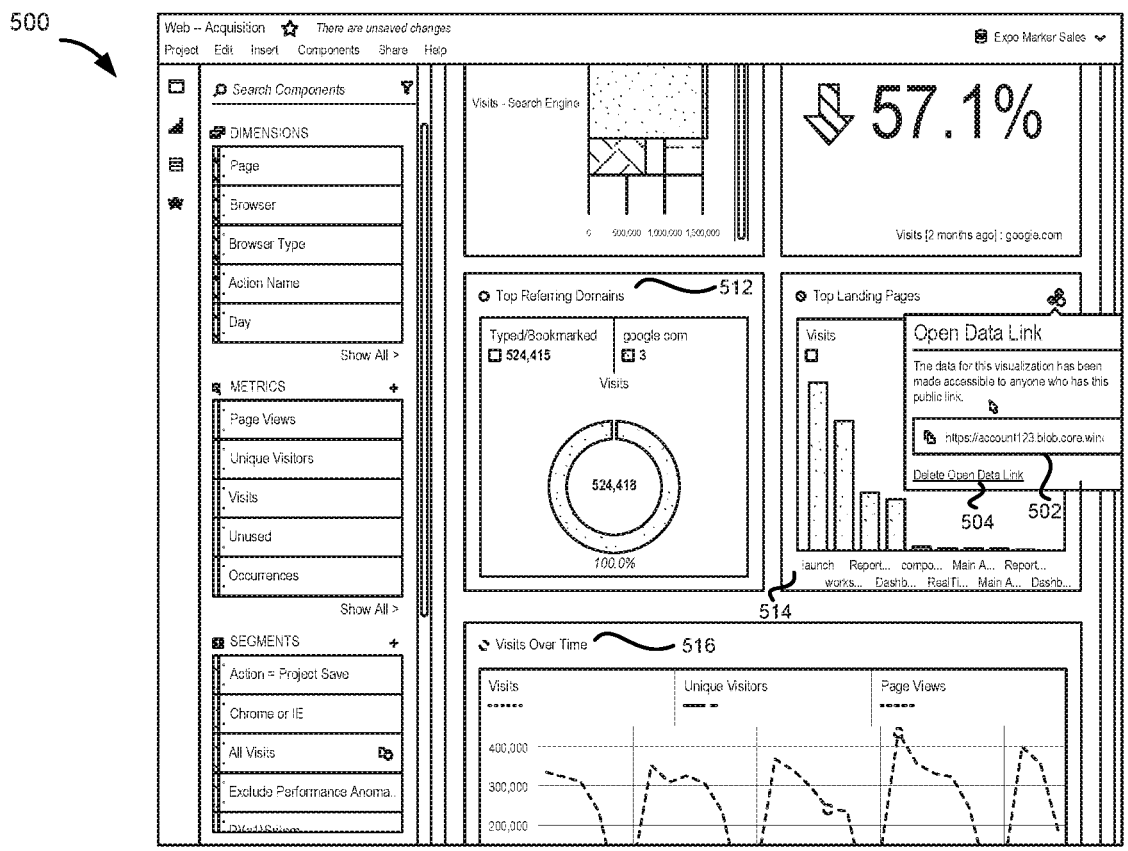
FIG. 5 depicts an example of a user interface for presenting report data in reports and generating an open data reference for the report data, according to certain embodiments of the present disclosure.

For example, the report definition 110 includes criteria or business rules that can be used to generate the correct results. The report definition 110 can further include a description of the ways or steps to generate queries for the report based on these criteria and business rules. Analytical results can be obtained by executing the queries on the source data. The report definition 110 can be written in any file format, such as a JavaScript Object Notation (JSON) file format, Extensible Markup Language (XML) format, and so on. The report can also include or define the way that the report data 120 is to be presented in a user interface. FIG. 5 shows an example of a user interface for presenting the report data 120 associated with various reports, such as a report on top referring domains, a report on top landing pages, a report on visits over time, and so on.

In order to obtain the report data 120, the data analysis application 104 generates one or more data queries 114 based on the report definition 110. The data queries 114 define the relevant data and the analysis, calculation or other operations to be performed on the relevant data in order to generate the report data 120. For example, if the report is a summary report for determining the number of users who visited a website in the past 10 minutes, the data analysis application 104 generates a data query to retrieve, from the source data 122, visitor data of the website for the past 10 minutes and then calculates the total number of visitors for the report. The data analysis application 104 sends the generated queries 114 to the data server 112 which in turn executes the queries 114 on the source data 122 to obtain the report data 120. The data server 112 returns the report data 120 to the data analysis application 104 for display.

As new data are collected and included in the source data 122, the data analysis application 104 periodically updates the data queries 114 to have the data server 112 to generate updated report data 120. In the above example, the data analysis application 104 can be configured to repeat the process of generating and executing the data query every minute to keep the generated total number of visitor in the past 10 minutes up to date.

In some implementations, the data analysis application 104 utilizes a model code 106 and executes the model code 106 to generate the data queries 114 for a report. The model code 106 can be written in any programming language that is executable in a software environment hosting the data analysis application 104. For example, if the data analysis application 104 is a web-based application, the model code 106 can be written using JavaScript language that can be executed in a web browser of the client computing device 102. Depending on the software environment where the data analysis application 104 is executed, different programming languages can be utilized to build the model code 106.

Because the report data 120 contains valuable information and insights, it is beneficial to share the report data 120 with other applications or other computing devices. According to certain embodiments presented herein, sharing the report data 120 can be achieved using an open data reference 108. The open data reference 108 specifies the location of the shared report data 120 and a tool for retrieving it. For example, the open data reference can be a URL link such as "https://account123.blob.core.windows.net/opendata/1d4e1rq4e1f4s1d4f.csv." Through the URL link, a third-party application or a third-party computing device can directly retrieve the shared data with a file name "1d4e1rq4e1f4s1d4f.csv" from the host "account123.blob.core.windows.net" using the hypertext transfer protocol secure (HTTPS).

In some examples, a user of the data analysis application 104 requests to generate the open data reference 108 for data sharing. For example, the data analysis application 104 can be configured to present a user interface through which the user can request the open data reference 108 for the report data 120 to be shared. An example of the user interface for requesting the open data reference 108 is shown in FIG. 5. Upon receiving the user request, the data analysis application 104 communicates with the data server 112 to allow the report data 120 specified in the user request to be shared through an open data reference 108.

The data analysis application 104 can generate the open data reference 108 for the report data 120 and send it along with a data sharing request to the data server 112 to have the shared report data 120 stored at the specified location. Alternatively, the data analysis application 104 can send a data sharing request to the data server 112 to request the generation of the open data reference 108 and the provision of the shared report data 120. In the latter case, the data server 112 generates the open data reference 108 and returns it to the data analysis application 104 so that it can be shared with other applications or devices. In either case, the data analysis application 104 or the data server 112 generates the open data reference 108 by hashing data such as the report identification, the user identification, and other information. The generated hash value can be used, for example, as the file name of the report data. Hashing can be performed using any existing hashing algorithm.

The data analysis application 104 further sends the report definition 110 to the data server 112 along with with or through the data sharing request 134. In some configurations, the data server 112 also has a copy of the model code 106 that resides on the client computing device 102. The data server 112 executes the model code 106 based on the report definition 110 to generate the data queries 114 used to generate the report data 120. In the above example where the model code 106 is written in JavaScript executable in a web browser of the client computing device 102, the data server 112 can be configured with a Node.js JavaScript run-time environment so that the model code 106 written in JavaScript can be executed outside of a web browser. If the report definition 110 is changed in the data analysis application 104, the updated report definition 110 is also sent to the data server 112 so that the data server 112 operates on the most recent report definition 110.

Sending the report definition 110 to the data server 112 allows the data server 112 to generate the report data 120 independently of the data analysis application 104. In other words, the data server 112 can generate the report data 120 even if the data analysis application 104 is not executing on the client computing device 102. Further, having the report definition 110, the data server 112 is able to generate the most recent data queries 114 thereby generating the most recent report data 120. This is especially useful if data queries are dynamic and change as the situations at the time of query change. For example, for a report showing website performance metrics for the past three days, a report generated on Apr. 5, 2019, needs a data query specifying a date range of April 2 to April 4 to retrieve and analyze the website performance metric. On Apr. 6, 2019, however, the same query cannot be used because the data range of April 2 to April 4 is no longer the past three days of the current date. Instead, a new query specifying a date range of April 3 to April 5 needs to be generated and used. In other scenarios where the data queries 114 are static, the data analysis application 104 can be configured to send the data queries 114, instead of the report definition 110, to the data server 112 in order to generate the report data 120.

For each open data reference 108, the data server 112 creates an open data reference record 116 to maintain the open data reference 108 and other information associated with the open data reference 108. For example, the open data reference record 116 can include the identification of the report for which the open data reference 108 is created, and the identification of the user who requested the open data reference 108. The open data reference record 116 can further include the report definition 110 used for generating the data queries 114, or the data queries 114 themselves if no report definition 110 is sent to the data server 112.

The data server 112 executes the data queries 114 on the source data 122 to generate the report data 120 to be shared. The data server 112 sends the report data 120 to a storage device that is accessible by applications or computing devices having possession of the open data reference 108. In one example, the report data 120 is stored in a cloud storage 124 that is separate from the data server 112. By separating the storage location of the shared report data 120 and the data server 112, the operational burden on the data server 112 can be significantly reduced because the network traffic requesting the shared report data 120 is directed to the cloud storage 124 rather than the data server 112. Further, cloud storage 124 can be optimized for retrieval speed and reliability, reducing the response speed and error rate associated with the retrieval of the report data. As the number of reports having shared report data 120 increases, this configuration also allows the system for data sharing to be easily scaled up. For example, the data server 112 can allocate the shared report data for different reports on different cloud storages.

In one example, the cloud storage 124 is storage provided by a cloud provider such as the blob storage offered by MICROSOFT AZURE developed by MICROSOFT Corporation from Redmond, Wash., USA. The blob storage allows arbitrarily large amounts of unstructured data to be stored and serve them to users over HTTP and HTTPS. Although FIG. 1 shows that cloud storage 124 is utilized for storing and sharing the report data 120, other types of storage devices can also be utilized. For example, the report data 120 can be stored in the data store 118 managed by the data server 112, or another storage device managed by a separate storage server.

In addition, due to the dynamic nature of the source data 122 and the report, the source data 122 periodically executes the model code 106 to generate updated data queries 114 and in turn to obtain the updated report data 120. The updated report data 120 is sent to the cloud storage 124 to replace the report data 120 stored thereupon. As a result, the report data 120 stored on the cloud storage 124 is kept up to date and reflects the most recent changes in the report data 120. In one example, the data server 112 updates the report data 120 every 5 minutes. In another example, updating the report data 120 is triggered by certain events as specified by the user or by the data server 112, such as an unexpected power outage at the data server 112, a specific time on a specific day has arrived, and so on.

To share the report data 120, the user requesting the data sharing can send the open data reference 108 to any device or application with which he or she desires to share the report data 120. For example, the user can use the data analysis application 104 or another application, such as an email application or a messaging application, to share the open data reference 108 with multiple third-party applications 128A-128B (which may be referred to herein individually as a third-party application 128 or collectively as the third-party applications 128). These third-party applications 128 can include other applications executing on the client computing device 102 or those applications executing on computing devices different from the client computing device 102 such as the third-party devices 130A-130B shown in FIG. 1. For example, the third-party applications 128 can include MICROSOFT EXCEL, GOOGLE SPREADSHEETS, third-party charting libraries, command lines, MICROSOFT POWER BI, HTML widgets and others. Following the information provided in the open data reference 108, each of the third-party applications 128 identifies the cloud storage 124 hosting the report data 120 and communicates with the cloud storage 124 to retrieve the report data 120 using the proper protocol.

If the user decides to deactivate the open data reference 108 for a report, the user can send a request for deactivating the data sharing to the data server 112 through the data analysis application 104. Responsive to such a request, the data server 112 deletes the open data reference record 116 corresponding to the report and instructs the cloud storage 124 to remove the copy of the report data 120. As a result, third-party applications 128 having the open data reference 108 can no longer access the report data 120. If the user decides to reactivate the open data reference 108, the data server 112 can repeat the process described above to generate the open data reference record 116, and generate and update the report data 120. In one implementation, the same open data reference 108 is generated for the same report so that the report data 120 can be shared with third-party applications 128 that already have the open data reference 108 without further operations.

Although not shown in FIG. 1, the communications between various devices and servers can be made through one or more networks. The network may be a local area network ("LAN"), a wide-area network ("WAN"), the Internet, a cellular network, or any other networking topology known in the art that connects the client computing device 102 to the data server 112, the data server 112 to the storage server 132, the client computing device 102 to the third-party computing device 130 or the third-party computing device 130 to the storage server 132. Additional details about sharing report data 120 through an open data reference 108 are provided below with regard to FIGS. 2-7.

Figure 2:
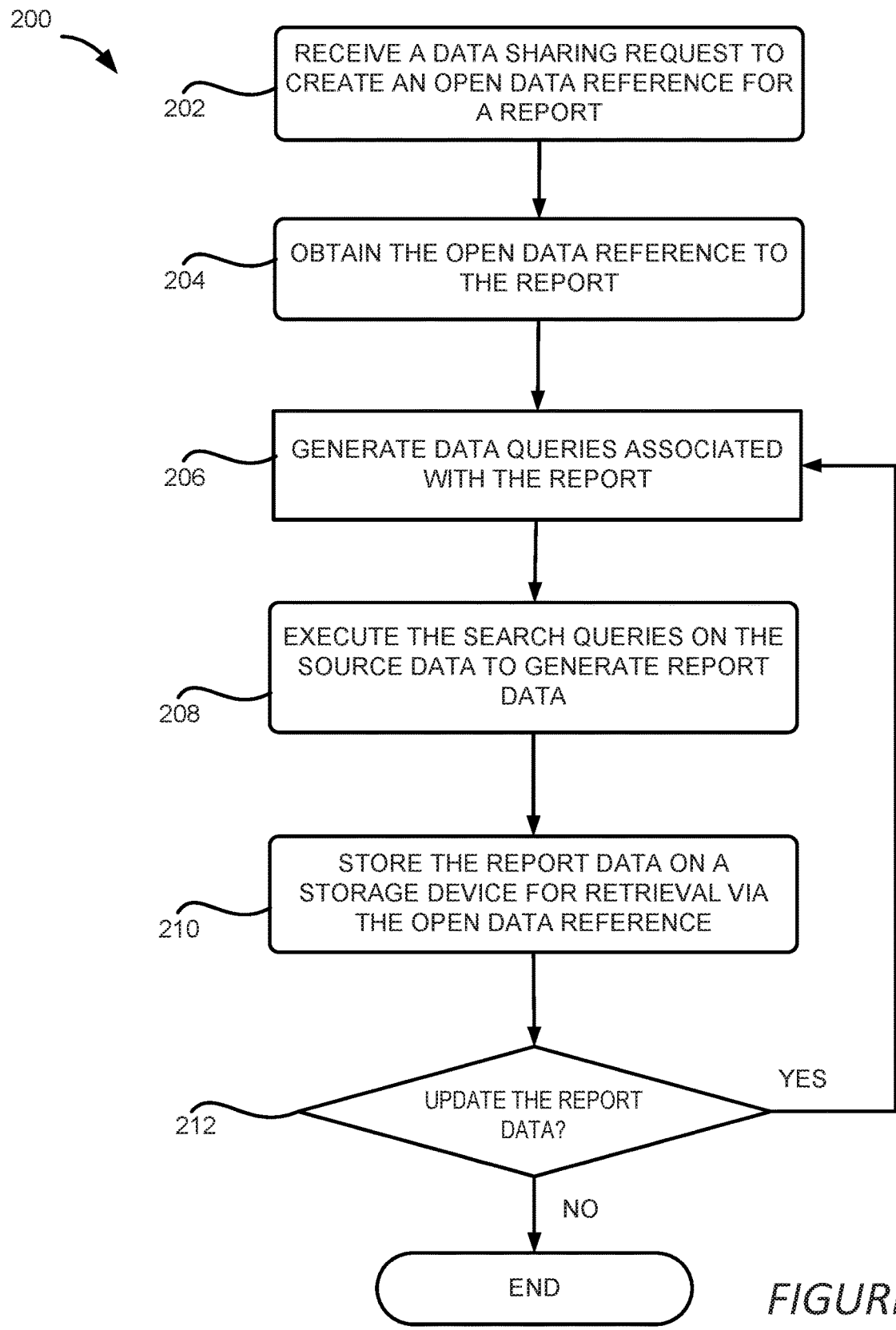
FIG. 2 depicts an example of a process for generating an open data reference that can be utilized to retrieve shared report data, according to certain embodiments of the present disclosure.

FIG. 2 depicts an example of a process 200 for generating an open data reference 108 that can be utilized to retrieve shared report data 120, according to certain embodiments of the present disclosure. One or more computing devices (e.g., the data server 112) implement operations depicted in FIG. 2 by executing suitable program code. For illustrative purposes, the process 200 is described with reference to certain examples depicted in the figures. Other implementations, however, are possible.

At block 202, the process 200 involves receiving a data sharing request 134 to share report data 120 of a report generated in the data analysis application 104. The data analysis application 104 generates the data sharing request 134 in response to a user submitting such a request through the data analysis application 104. In some examples, the data sharing request 134 includes an identification of the report whose report data 120 is to be shared, an identification of the user, the report definition 110 of the report and the open data reference 108 if the data analysis application 104 has generated the open data reference 108.

At block 204, the process 200 involves obtaining the open data reference 108. If the open data reference 108 is generated at the data analysis application 104, the open data reference 108 is included in or sent along with the data sharing request 134. The data server 112 can obtain the open data reference 108 from the data sharing request 134. If the data sharing request 134 does not include the open data reference 108, the data server 112 generates the open data reference 108 for the report. The data server 112 or the data analysis application 104 generates the open data reference 108 by hashing data such as the report identification, the user identification, and other information. The generated hash value can be used as the file name of the shared report data 120. The open data reference 108 further includes information regarding the location of the shared report data 120 and a tool for retrieving it. As such, the open data reference 108 can be further generated based on information such as the availability and capacity of cloud storage 124 used for storing the report data, the network location of the storage server 132 managing the cloud storage 124, the protocol supported by the storage server 132, and so on.

At block 206, the process 200 involves generating data queries 114 that can be utilized to generate the report data 120 for the report. In one example, the data server 112 generates the data queries 114 by executing a model code 106 that is the same as the model code utilized by the data analysis application 104 at the data analysis application 104. In some configurations, the data server 112 is configured with a proper run-time environment for the model code 106 so that it can be executed in an environment that is different from the data analysis application 104. For example, a Node.js JavaScript run-time environment can be installed and executed on the data server 112 so that the model code 106 written in JavaScript can be executed outside of a web browser where the data analysis application 104 is executed.

At block 208, the process 200 involves executing the data queries 114 on the source data 122 to generate the report data 120 to be shared. At block 210, the process 200 involves storing the report data 120 on cloud storage 124 as specified by the location information in the open data reference 108. The data server 112 can generate and store the report data 120 in multiple formats, such as a JSON file, a comma-separated values (CSV) file, or an XML file. A third-party application 128 can use the open data reference 108 to retrieve the report data 120 in different formats. A detailed example of using and retrieving the report data 120 via the open data reference 108 is provided with regard to FIG. 6.

At block 212, the process 200 involves determining whether to update the report data 120. The data server 112 makes such a determination by determining whether a pre-determined time point has arrived. For example, the data server 112 can be configured to update the report data 120 periodically, e.g. every 5 minutes. Once the next 5-minutes time point has arrived, the data server 112 determines that the report data 120 should be updated. The data server 112 can also determine to update the report data 120 when a specific event has occurred. For instance, the data server 112 can determine to update the report data 120 if an unexpected power outage has occurred at the data server 112 and power is restored, or at a specific time on a specific day as specified by the user or the data server 112.

If, at block 212, the data server 112 determines that the report data 120 is to be updated, the process 200 repeats the operations at blocks 206-212 as described above. If the data server 112 determines that the report data 120 does not need to be updated, for example, by receiving an instruction from the data analysis application 104 that no updates need to be performed, the process 200 ends.

Figure 3A:
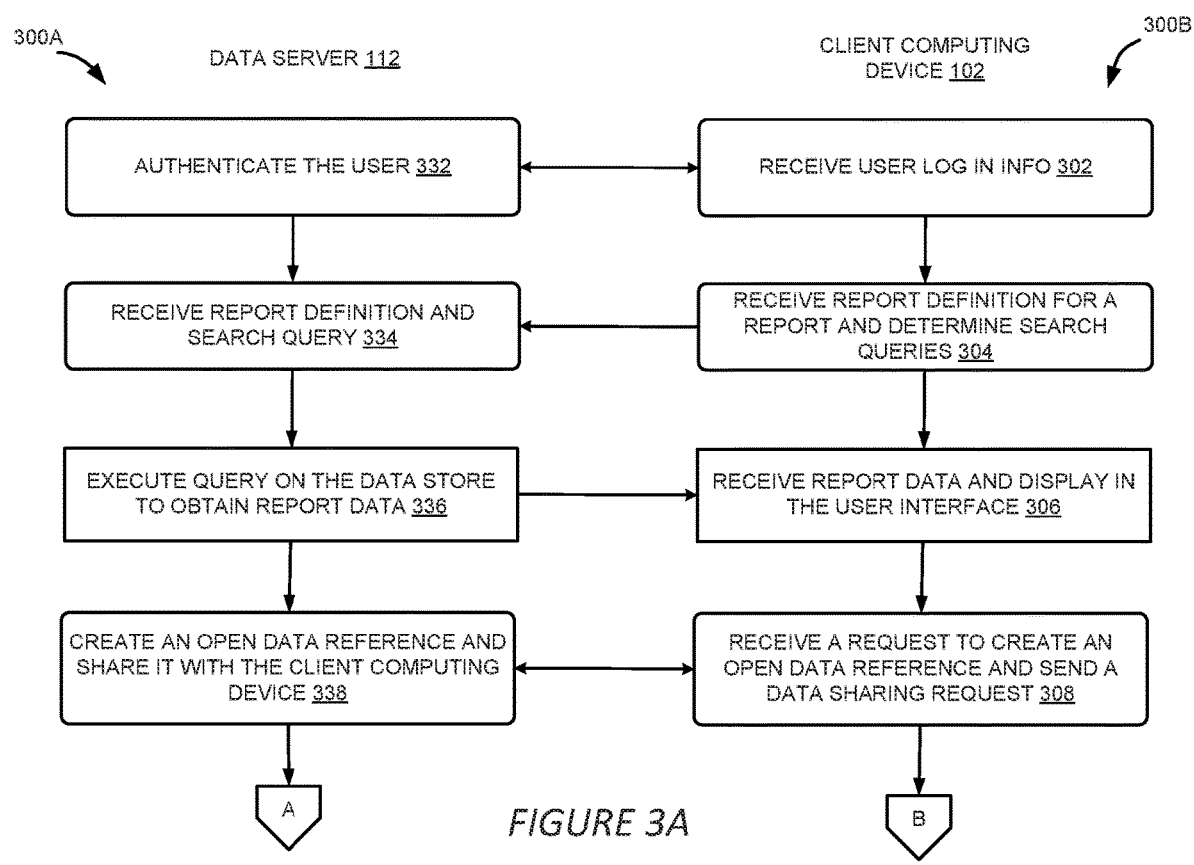
FIGS. 3A-3C depict examples of flow diagrams that show interactions between various entities involved in the data sharing process, according to certain embodiments of the present disclosure.
Figure 3B:
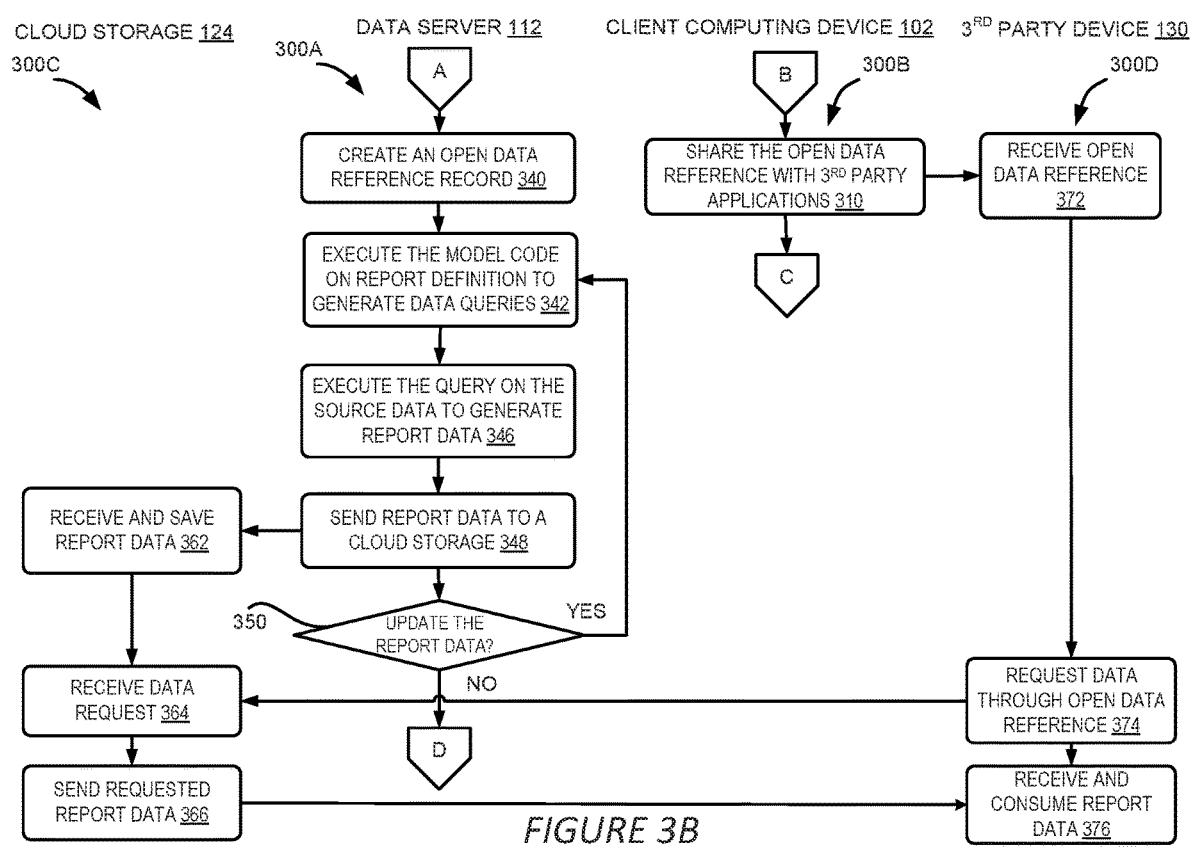
Figure 3C:
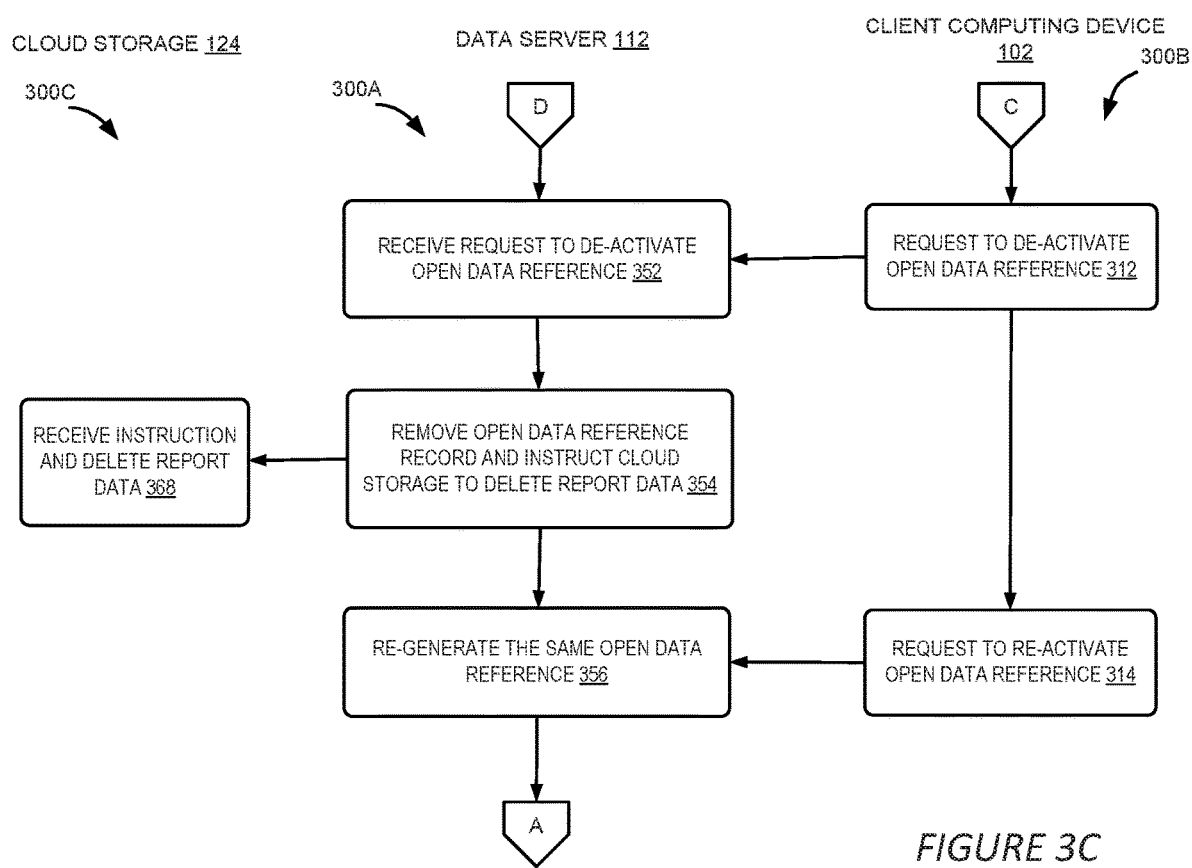

FIGS. 3A-3C depict examples of flow diagrams that show interactions between various entities involved in the data sharing process, according to certain embodiments of the present disclosure. In particular, the process 300A illustrates aspects of the data server 112; the process 300B illustrates aspects of the client computing device 102 or more specifically, the data analysis application 104; the process 300C illustrates aspects of the data cloud storage 124 and the process 300D illustrates the aspects of a third-party computing device 130. The processes 300A-300D will be described together below.

At block 302, the process 300B involves receiving a user log-in request to the data analysis application 104 along with user credentials. The client computing device 102 sends the user credentials to the data server 112. At block 332, the process 300A involves authenticating the user based on the received user credentials. Upon authentication, the data server 112 sends a confirmation to the client computing device 102 and the data analysis application 104 logs in the user into the data analysis application 104 under his or her account.

At block 304, the process 300B involves receiving the report definition 110 for a report and generating data queries 114 based on the report definition 110. For example, a user can specify through a user interface of the data analysis application 104 various business rules and criteria associated with the report to generate the report definition 110. The data analysis application 104 executes a model code 106 based on the report definition 110 to determine the data queries 114. An example of the report definition 110 and its corresponding data query 114 are shown in Table 1. The client computing device 102 further sends the data queries 114 and the report definition 110 to the data server 112.

TABLE 1

An example of a report defintion and the corresponding
data query shown in JSON file format

| Report definition | Data query |
|---|---|
| {<br>  "rsid": "test.rs",<br>  "definition": {<br>    "workspaces": [<br>      {<br>        "id": "767B79BC-FE1E-D9DA-3DC7-1B21EBBE6FC8",<br>        "panels": [<br>          {<br>            "id": "576A9886-631C-C5D7-14F8-0F2D73C1406E",<br>            "dateRange": {<br>              "id": "thisMonth",<br>              "\_entity\_": true,<br>              "type": "DateRange",<br>              "\_metaData\_": {<br>                "name": "This month"<br>              }<br>            },<br>            "name": "Freeform",<br>            "subPanels": [<br>              {<br>                "id": "A50EE09C-54D0-B434-F981-486A156FA53C",<br>                "linkedSourceId": "",<br>                "reportlet": {<br>                  "columnTree": {<br>                    "id": "5497D11B-84A4-D174-3431-63E57938DBBD",<br>                  "nodes": [<br>                    {<br>                      "id": "5AB131E7-05BF-7877-A5B1-86643DE2A41A",<br>                      "component": {<br>                        "id": "metrics/visits",<br>                        "type": "Metric",<br>                        "\_metaData\_": {<br>                          "name": "Visits"<br>                        }<br>                      },<br>                      "name": "Visits",<br>                      "nodes": [ ]<br>                    },<br>                    {<br>                      "id": "4776BDF5-A68C-AFFE-8E34-944300FECD93",<br>                      "component": {<br>                        "id": "metrics/occurrences",<br>                        "type": "Metric",<br>                        "\_metaData\_": {<br>                          "name": "Occurrences"<br>                        }<br>                      },<br>                      "name": "Occurrences",<br>                      "nodes": [ ]<br>                    }<br>                ]<br>              },<br>              "freeformTable": {<br>            "alignDatesForTimeDimension": true,<br>              "breakdowns": [ ],<br>              "dimension": {<br>                "id": "variables/page",<br>                "type": "Dimension",<br>                "\_metaData\_": {<br>                  "name": "Page"<br>                }<br>              },<br>              "pagination": {<br>                "currentPage": 0,<br>                "viewBy": 5<br>              },<br>              "search": {<br>                "operator": "AND", | {<br>  "rsid": "test.rs",<br>  "globalFilters": [<br>    {<br>      "type": "dateRange",<br>      "dateRange": "2019-05-01T00:00:00.000/2019-06-01T00:00:00.000"<br>    }<br>  ],<br>  "metricContainer": {<br>    "metrics": [<br>      {<br>        "columnId": "0",<br>        "id": "metrics/visits"<br>      },<br>      {<br>        "columnId": "1",<br>        "id": "metrics/occurrences",<br>        "sort": "desc"<br>      }<br>    ]<br>  },<br>  "dimension": "variables/page",<br>  "settings": {<br>    "countRepeatInstances": true,<br>    "limit": 5,<br>    "page": 0<br>  },<br>  "statistics": {<br>    "functions": [<br>      "col-max",<br>      "col-min"<br>    ]<br>  }<br>} |

TABLE 1-continued

An example of a report defintion and the corresponding
data query shown in JSON file format

| Report definition | Data query |
|---|---|
| | "rules": [ ]<br>},<br>"settings": {<br>  "breakdownByPosition": false,<br>  "rowBasedPercentages": false,<br>  "totalsType": "allVisits"<br>},<br>"sort": {<br>  "asc": false,<br>  "columnId": "4776BDF5-A68C-AFFE-8E34-944300FECD93",<br>  "labelColumn": false<br>},<br>"statistics": {<br>  "functions": [ ],<br>  "ignoreZeros": true<br>}<br>},<br>"type": "FreeformReportlet"<br>},<br>"type": "genericSubPanel",<br>"visible": true,<br>"visualizationIndex": 1<br>}<br>]<br>}<br>]<br>}<br>]<br>}<br>]<br>} |

At block 334, the data server 112 receives the data queries 114 and the report definition 110. At block 336, the data server 112 executes the data queries 114 on the source data 122 to obtain the report data 120. The data server 112 returns the report data 120 to the client computing device 102 so that the data analysis application 104 can display in the user interface for the user at block 306. At block 308, the client computing device 102 receives a request from the user, e.g. through the user interface of the data analysis application 104, to create an open reference 108 in order to share the report data 120 for the report that is being displayed in the data analysis application 104. In response to receiving the request from the user, the data analysis application 104 generates and sends a data sharing request 134 to the data server 112. As described above, the data sharing request 134 can include the identification of the user, the identification of the report, the report definition 110 and other information.

At block 338, the data server 112 creates an open data reference 108 for the report data 120 to be shared. In some configurations, the created open data reference 108 is specific for the user and the report. In other words, if two different users each request to create an open data reference 108 for the same report, two different open data references 108 will be created. Similarly, if a user wants to share the report data 120 for two reports, the data analysis application 104 sends two separate data sharing requests 134 and the data server 112 creates two separate open data references 108.

In one example, the data server 112 generates the open data reference 108 by hashing data such as the report identification, the user identification, and other information. The data server 112 sends the generated open data reference 108 to the data analysis application 104. At block 310, the data analysis application 104 shares the open data reference 108 with other applications or devices, either through the user copying and pasting the open data reference 108 or by the data analysis application 104 automatically sending the open data reference 108 according to certain configurations.

Figure 4:
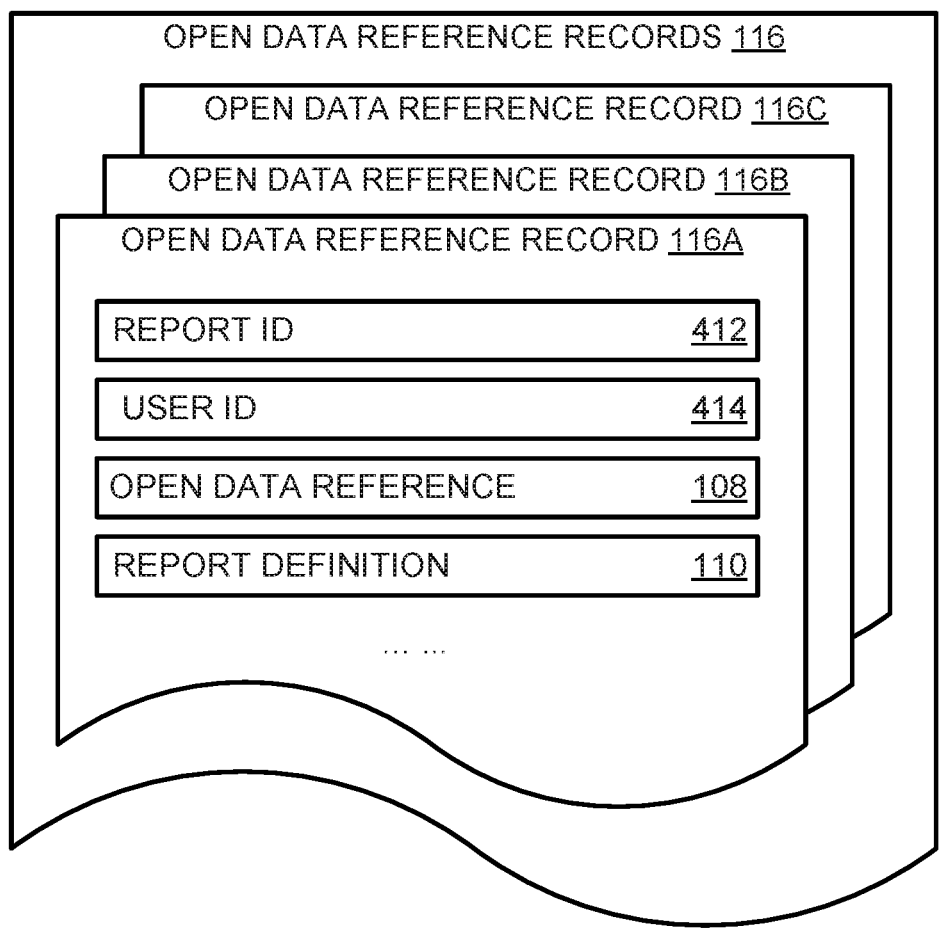
FIG. 4 depicts an example of a data structure for open data reference records established and used in maintaining the open data reference, according to certain embodiments of the present disclosure.

At block 340, the data server 112 creates an open data reference record 116 to record and maintain information associated with the open data reference 108. FIG. 4 depicts an example of a data structure for the open data reference records 116A-116C, which may be referred to herein individually as an open data reference record 116 or collectively as the open data reference records 116. In this example, an open data reference record 116 is created for each open data reference 108. The open data reference record 116 includes a report identification 412 to identify the report for which the open data reference 108 is generated. The open data reference record 116 further includes the report definition 110 of the report and a user identification 414, such as the account number or a user name, of the user who requested the open data reference 108.

The information in the open data reference record 116, such as the user identification 414, the report identification 412, and the report definition 110, can be obtained from the data sharing request 134. If the user updates the report definition 110 through the data analysis application 104, the data analysis application 104 sends the updated report definition 110 to the data server 112. The data server 112, in turn, updates the report definition 110 stored in the open data reference record 116. The open data reference record 116 further includes the generated open data reference 108.

At block 342, the data server 112 generates one or more data queries for obtaining the report data 120. In one example, the data server 112 executes a model code 106 based on the report definition 110 to generate the data query. At block 346, the data server 112 executes the generated query on the source data 122 to obtain the report data 120. At block 348, the data server 112 sends the report data 120 to the cloud storage 124 as specified in the open data reference 108 and instructs the cloud storage 124 to store the report data 120 at a location referenced in the open data reference 108.

At block 362, the cloud storage 124 receives the report data 120 and stores it in a location as instructed by the data server 112. At block 350, the data server 112 determines whether to update the report data 120. If so, the data server 112 repeats the operations in blocks 342-348 to generate updated report data 120 and to send it to the cloud storage to replace the existing version stored thereupon.

At block 372, a third-party computing device 130 receives the open data reference 108 distributed by the user through the client computing device 102 or another device. At block 374, the third-party computing device 130 requests the shared report data 120 using the open data reference 108. The open data reference 108 directs the request of the third-party computing device 130 to the cloud storage 124. At block 364, the cloud storage 124 receives the request and at block 366, the cloud storage 124 retrieves and sends the requested report data 120 back to the third-party computing device 130 over the network. At block 376, the third-party computing device 130 receives and consumes the report data 120 by, for example, displaying it, integrating it into another application, or the combination thereof. The third-party computing device 130 may also be configured to periodically retrieve the report data 120 from the cloud storage 124 to obtain the most recent report data 120.

At block 312, the client computing device 102 sends a request to the data server 112 to de-activate the open data reference 108, for example, in response to receiving user input requesting the deactivation. At block 352, the data server 112 receives the request and, at block 354, removes the open data reference record 116 corresponding to the deactivated open data reference 108. The data server 112 further instructs the cloud storage 124 to delete the report data 120 stored there. At block 314, the client computing device 102 requests the data server 112 to re-activate the open data reference 108, for example, in response to receiving user input requesting the reactivation. At block 356, the data server 112 re-generates the open data reference 108. In one example, the re-generated open data reference 108 is the same as the previous open data reference 108 generated for the same user and the same report. The data server 112 repeats the operations involved in blocks 340-350 to generate the report data 120 for sharing.

By regenerating the same open data reference 108, the user does not need to re-send the open data reference 108 to the third-party applications with which the report data 120 was previously being shared. This reduces the consumption of the communication bandwidth and computing resources at the data analysis application 104, especially for scenarios where a large number of third-party computing devices 130 are involved. If the user wants to prevent previous third-party computing devices 130 from having access to the report data 120, the user can create a new report with a different report identification but the same content. For this new report, the data server 112 would generate a different open data reference 108 and only those third-party computing devices 130 having the new open data reference 108 have access to the report data 120.

FIG. 5 depicts an example of a user interface (UI) 500 presented in the data analysis application 104 for displaying report data in various reports. The UI 500 includes multiple panels 512-516, each panel representing report data for a report. For example, panel 512 is configured to present the report data for a report on top referring domains. Panel 514 is configured to present the report data for a report on top landing pages and panel 516 is configured to present report data for a report on visits over time. If a user decides to share the report data 120 of the report shown in panel 514, the user requests an open data reference 108 by interacting with the panel 514. For example, the user can right click on the panel 514 to bring up a menu and select an option for creating an open data reference 108. Alternatively, or additionally, the user can click on a different type of user interface control to create the open data reference 108.

In response to the user's request, the data analysis application 104 generates and presents a box 504 displaying an open data reference 502 generated for the report shown in panel 514. The user can copy the open data reference 502 and send it to other applications or devices. In another example, the data analysis application 104 can be configured to provide functionalities that allow the user to share the open data reference 502 with other applications or devices, such as through emails or messages.

Figure 6:
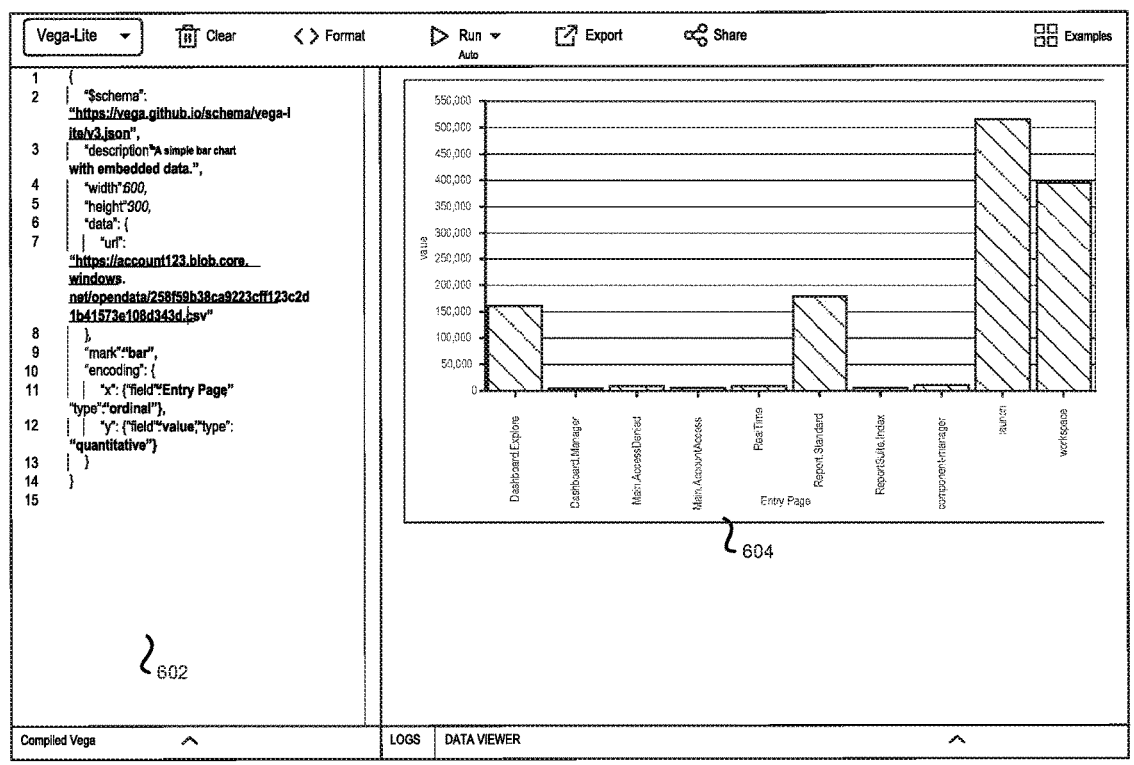
FIG. 6 depicts an example of a user interface for utilizing an open data reference to retrieve report data for integration into a third-party application, according to certain embodiments of the present disclosure.

FIG. 6 depicts an example of a user interface 600 of a third-party application 128 that utilizes an open data reference 108 to retrieve report data 120 and integrate it into the third-party application 128. The UI 600 includes two windows: window 602 displays the source code of the third-party application 128, and window 604 displays the execution results of the third-party application 128. In the example shown in FIG. 6, the open data reference 502 generated in UI 500 is copied and pasted into the source code of the third-party application 128 shown in window 602. In this example, the open data reference 108 is a URL link and a CSV file format of the report data 120 is requested. Following the URL, a copy of the report data 120 is retrieved from the cloud storage 124. Window 604 shows the results generated based on the retrieved data. Because the report data 120 stored on the cloud storage 124 is updated periodically, the results shown in window 604 is also up to date. As discussed above, if the user modifies the report in the data analysis application 104, the report data 120 stored on the cloud storage 124 will be updated by the data server 112 and the retrieved report data 120 by the third-party application 128 will also be updated.

As can be seen from the example shown in FIG. 6, certain embodiments presented herein allow users to easily access report data of a report through an open data reference. Insteading of using complicated data sharing tools such as API calls, the data sharing presented herein utilizes an open data reference that includes a user familiar object, such as a URL, which a user already knows, or can quickly learn, how to use. This improved interface allows for rapidly accessing and processing report data by third-party applications and systems regardless of how complicated the report or the report data is.

Although the above examples describe that the user requests the open data reference 108 through a user interface of the data analysis application 104, the open data reference 108 can be generated by the data analysis application 104 without the user operating through a user interface. In addition, authentication of the user is performed at the time the user logs into the data analysis application 104. No additional authentication needs to be performed when the user requests the open data reference 108 or when the third-party application 128 retrieves that report data 120. As such, the open data reference 108 is unauthenticated and can be used to publicly share the report data 120 without revealing the underlying source data 122. In addition, by using the deterministic open data reference 108, third-party applications 128 can directly obtain the report data 120 without the need to repeat the process of generating the report data 120.

Example of a Computing System for Implementing Certain Embodiments

Figure 7:
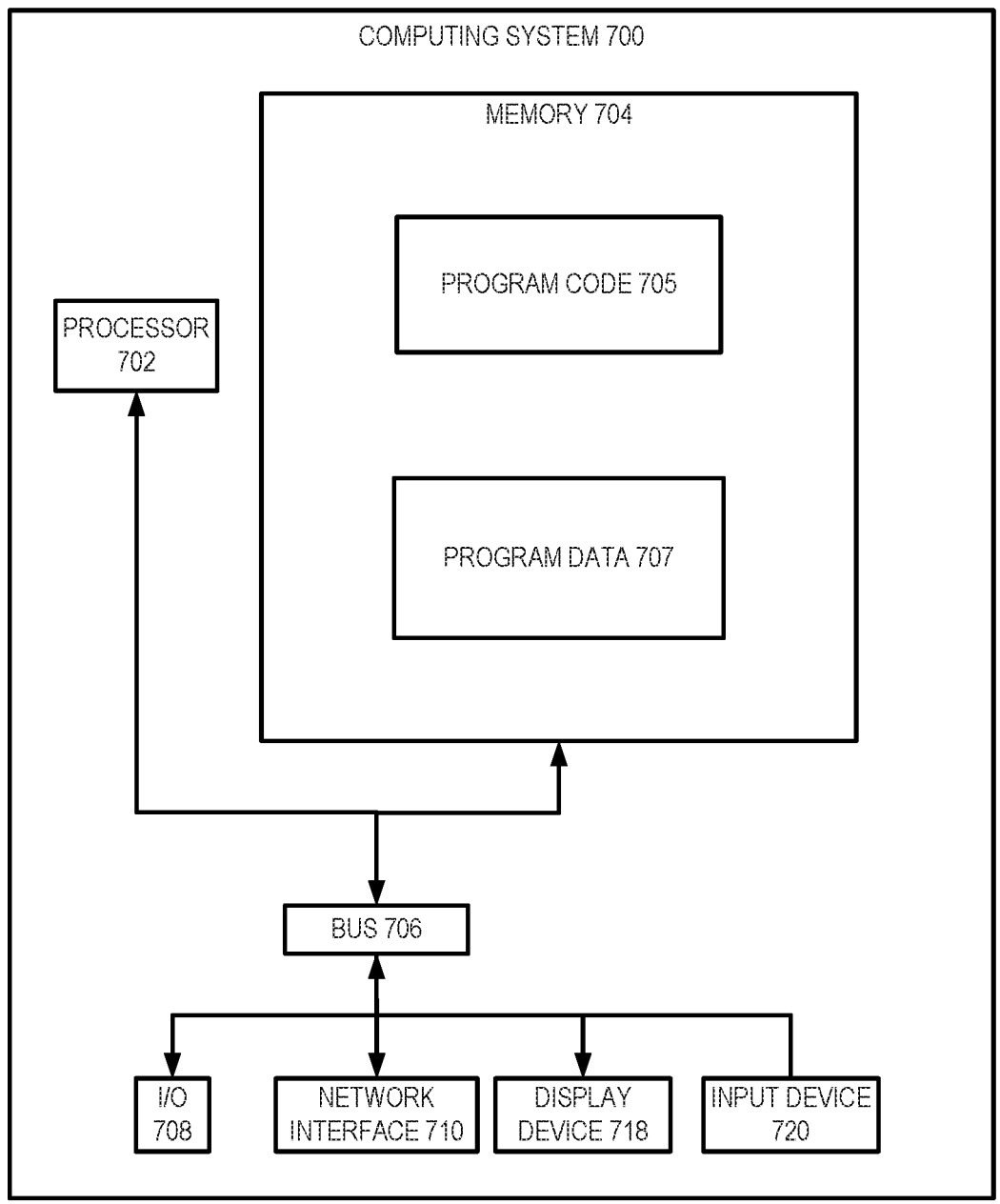
FIG. 7 depicts an example of a computing system for implementing certain embodiments of the present disclosure.

Any suitable computing system or group of computing systems can be used for performing the operations described herein. For example, FIG. 7 depicts an example of the computing system 700. The implementation of computing system 700 could be used for one or more of a client computing device 102 or a data server 112. In other embodiments, a single computing system 700 having devices similar to those depicted in FIG. 7 (e.g., a processor, a memory, etc.) combines the one or more operations and data stores depicted as separate systems in FIG. 1.

The depicted example of a computing system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

A memory device 704 includes any suitable non-transitory computer-readable medium for storing program code 705, program data 707, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 700 executes program code 705 that configures the processor 702 to perform one or more of the operations described herein. Examples of the program code 705 include, in various embodiments, the data analysis application 104, the model code 106, or other suitable applications that perform one or more operations described herein. The program code 705 may reside in the memory device 704 or any suitable computer-readable medium and may be executed by the processor 702 or any other suitable processor.

In some embodiments, one or more memory devices 704 stores program data 707 that includes one or more datasets and models described herein. Examples of these datasets include interaction data, performance data, etc. In some embodiments, one or more of data sets, models, and functions are stored in the same memory device (e.g., one of the memory devices 704). In additional or alternative embodiments, one or more of the programs, data sets, models, and functions described herein are stored in different memory devices 704 accessible via a data network. One or more buses 706 are also included in the computing system 700. The buses 706 communicatively couples one or more components of a respective one of the computing system 700.

In some embodiments, the computing system 700 also includes a network interface device 710. The network interface device 710 includes any device or group of devices suitable for establishing a wired or wireless data connection to one or more data networks. Non-limiting examples of the network interface device 710 include an Ethernet network adapter, a modem, and/or the like. The computing system 700 is able to communicate with one or more other computing devices (e.g., a client computing device 102 or a cloud storage 124) via a data network using the network interface device 710.

The computing system 700 may also include a number of external or internal devices, an input device 720, a presentation device 718, or other input or output devices. For example, the computing system 700 is shown with one or more input/output ("I/O") interfaces 708. An I/O interface 708 can receive input from input devices or provide output to output devices. An input device 720 can include any device or group of devices suitable for receiving visual, auditory, or other suitable input that controls or affects the operations of the processor 702. Non-limiting examples of the input device 720 include a touchscreen, a mouse, a keyboard, a microphone, a separate mobile computing device, etc. A presentation device 718 can include any device or group of devices suitable for providing visual, auditory, or other suitable sensory output. Non-limiting examples of the presentation device 718 include a touchscreen, a monitor, a speaker, a separate mobile computing device, etc.

Although FIG. 7 depicts the input device 720 and the presentation device 718 as being local to the computing device, other implementations are possible. For instance, in some embodiments, one or more of the input device 720 and the presentation device 718 can include a remote client-computing device that communicates with the computing system 700 via the network interface device 710 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method in which one or more processing devices perform operations comprising:
   receiving, from an application executing on a client computing device, a request to generate an open data reference specifying a location for storing report data associated with a report;
   in response to receiving the request, generating the open data reference and transmitting the open data reference to the client computing device;
   generating a data query based on a report definition of the report that describes how the report data associated with the report is generated, wherein the report definition is received from the client computing device;
   generating an open data reference record for the open data reference, the open data reference record comprising an identification of the report, the open data reference, and the report definition of the report;
   executing the data query on source data stored in a data store to obtain the report data;
   causing the report data returned by the query to be stored on a storage device at the location specified by the open data reference, wherein the report data is retrievable via a network using the open data reference for integration within a third-party application; and
   causing the report data stored on the storage device to be replaced with updated report data, the updated report data being generated by executing, on the source data, an updated data query generated based on the report definition of the report stored in the open data reference record for the open data reference.

2. The method of claim 1, wherein the request to generate an open data reference is submitted through a user interface presenting the report data on the client computing device.

3. The method of claim 2, wherein generating the data query based on the report definition comprises executing a model code based on the report definition to generate the data query, wherein a copy of the model code is stored and configured to be executed on the client computing device to generate a data query for retrieving the report data presented in the user interface.

4. The method of claim 3, wherein the model code comprises code written in JavaScript and executable in a web browser on the client computing device, and wherein executing the model code comprises executing the model code in a node.js environment.

5. The method of claim 1, wherein the open data reference to the report data associated with the report is generated by hashing at least one or more of an identification of the report and an identification of a user requesting the open data reference.

6. The method of claim 1, wherein the open data reference to the report data is public and usable to retrieve the report data stored on the storage device without authentication.

7. The method of claim 1, wherein the open data reference record further comprises an identification of a user requesting the open data reference.

8. The method of claim 7, further comprising:
   responsive to receiving an instruction to deactivate the open data reference, deleting the open data reference record for the open data reference; and
   causing the updated report data stored on the storage device to be removed.

9. The method of claim 8, further comprising:
   responsive to receiving an instruction to re-activate the open data reference,
      re-generating the open data reference record for the open data reference;
      generating a new data query based on the report definition;
      executing the new data query on the source data stored in the data store to obtain a new version of the report data; and
      storing the new version of the report data on the storage device, wherein the new version of the report data is retrievable through the network via the open data reference.

10. A system comprising:
   a processing device; and
   a non-transitory computer-readable medium communicatively coupled to the processing device, wherein the processing device is configured to execute program code stored in the non-transitory computer-readable medium and thereby perform operations comprising:
      obtaining an open data reference to report data associated with a report, wherein the open data reference is obtained in response to receiving a request for the open data reference from an application executing on a client computing device, the open data reference specifying a location for storing the report data associated with the report;
      transmitting the open data reference to the client computing device;
      generating a data query based on a report definition of the report that describes how the report data associated with the report is generated, wherein the report definition is received from the client computing device;

generating an open data reference record for the open data reference, the open data reference record comprising an identification of the report, the open data reference, and the report definition of the report;

executing the data query on source data stored in a data store to obtain the report data;

causing the report data returned by the query to be stored on a storage device at the location specified by the open data reference, wherein the report data is retrievable through a network by a third-party application using the open data reference; and causing the report data stored on the storage device to be replaced with updated report data, the updated report data being generated by executing, on the source data, an updated data query generated based on the report definition of the report stored in the open data reference record for the open data reference.

11. The system of claim 10, wherein the request for the open data reference is submitted through a user interface presenting the report data on the client computing device.

12. The system of claim 10, wherein obtaining the open data reference to the report data associated with the report comprises generating the open data reference by hashing at least one or more of an identification of the report and an identification of a user requesting the open data reference.

13. The system of claim 10, wherein the open data reference record further comprises an identification of a user requesting the open data reference.

14. The system of claim 13, wherein the operations further comprise:
responsive to receiving an instruction to deactivate the open data reference, deleting the open data reference record for the open data reference; and
causing the updated report data stored on the storage device to be removed.

15. The system of claim 14, wherein the operations further comprise:
responsive to receiving an instruction to re-activate the open data reference,
re-generating the open data reference record for the open data reference;
generating a new data query based on the report definition;
executing the new data query on the source data stored in the data store to obtain a new version of the report data; and
storing the new version of the report data on the storage device, wherein the new version of the report data is retrievable through the network via the open data reference.

16. A non-transitory computer-readable medium having program code stored thereon, the program code executable by one or more processing devices for performing operations comprising:
generating an open data reference specifying a location for storing report data associated with a report, wherein the open data reference is generated in response to receiving a request for the open data reference from an application executing on a client computing device;

transmitting the open data reference to the client computing device;

generating a data query based on a report definition of the report that describes how the report data associated with the report is generated, wherein the report definition is received from the client computing device;

generating an open data reference record for the open data reference, the open data reference record comprising an identification of the report, the open data reference, and the report definition of the report;

executing the data query on source data stored in a data store to obtain the report data;

causing the report data returned by the query be stored on a storage device at the location specified by the open data reference, wherein the report data is retrievable via a network using the open data reference; and causing the report data stored on the storage device to be replaced with updated report data, the updated report data being generated by executing, on the source data, an updated data query generated based on the report definition of the report stored in the open data reference record for the open data reference.

17. The non-transitory computer-readable medium of claim 16, wherein generating the data query based on the report definition comprises executing a model code based on the report definition to generate the data query, wherein a copy of the model code is stored and configured to be executed on the client computing device to generate a data query for retrieving the report data presented in a user interface on the client computing device.

18. The non-transitory computer-readable medium of claim 17, wherein the model code comprises code written in JavaScript and executable in a web browser on the client computing device, and wherein executing the model code comprising executing the model code in a node.js environment.

19. The non-transitory computer-readable medium of claim 16, wherein the operations further comprise:
responsive to receiving an instruction to deactivate the open data reference, deleting an open data reference record for the open data reference; and
causing the updated report data stored on the storage device to be removed.

20. The non-transitory computer-readable medium of claim 19, wherein the operations further comprise:
responsive to receiving an instruction to re-activate the open data reference,
re-generating the open data reference record for the open data reference;
generating a new data query based on the report definition;
executing the new data query on the source data stored in the data store to obtain a new version of the report data; and
storing the new version of the report data on the storage device, wherein the new version of the report data is retrievable through the network via the open data reference.

* * * * *